(12) United States Patent
Moredock et al.

(10) Patent No.: US 6,406,506 B1
(45) Date of Patent: Jun. 18, 2002

(54) AIR CLEANER

(75) Inventors: James G. Moredock; Eric L. Ehrenberg, both of Jacksonville, FL (US)

(73) Assignee: Sy-Klone Company, Inc., Jacksonville, FL (US)

( * ) Notice: Subject to any disclaimer, the term of this patent is extended or adjusted under 35 U.S.C. 154(b) by 0 days.

(21) Appl. No.: 09/988,695

(22) Filed: Nov. 20, 2001

Related U.S. Application Data

(63) Continuation of application No. 09/523,516, filed on Mar. 10, 2000, now Pat. No. 6,338,745.
(60) Provisional application No. 60/124,010, filed on Mar. 12, 1999.

(51) Int. Cl.[7] ............................................. B01D 45/14
(52) U.S. Cl. ........................... 55/337; 55/394; 55/401; 55/406; 55/438; 55/457
(58) Field of Search ...................... 55/392, 394, 337, 55/400, 401, 406, 437, 438, 457

(56) References Cited

U.S. PATENT DOCUMENTS

| | | | |
|---|---|---|---|
| 1,931,194 A | 10/1933 | Hawley | 55/396 |
| 2,462,797 A | 2/1949 | Whitaker | 55/396 |
| 3,064,411 A | 11/1962 | Breslove, Jr. | 55/457 |
| 3,069,071 A | 12/1962 | Carlson | 55/438 |
| 3,137,552 A | 6/1964 | Weinand | |
| 3,191,364 A | 6/1965 | Sylvan | |
| 3,217,976 A | 11/1965 | Downs | 55/438 |
| 3,276,189 A | 10/1966 | Sylvan | 55/438 |
| 3,276,679 A | 10/1966 | Booth | |
| 3,444,672 A | 5/1969 | Alsobrooks | |
| 3,751,907 A | 8/1973 | Anderson | |
| 3,885,934 A | 5/1975 | Eads et al. | 55/392 |
| 4,066,552 A | 1/1978 | Caine | |
| 4,702,071 A | 10/1987 | Jenkins et al. | |
| 4,971,518 A | 11/1990 | Florin | |
| 5,000,769 A | 3/1991 | Raguideau et al. | |
| 5,240,593 A | 8/1993 | Moredock | |
| 5,431,535 A | 7/1995 | Klujber | |
| 5,656,050 A | 8/1997 | Moredock | |
| 5,766,315 A | 6/1998 | Moredock | |

FOREIGN PATENT DOCUMENTS

RU     615247     7/1978     .................. 55/457

*Primary Examiner*—Robert A. Hopkins
(74) *Attorney, Agent, or Firm*—Antonelli, Terry, Stout & Kraus, LLP

(57) ABSTRACT

An air cleaner for centrifugally ejecting heavier-than-air particulate debris from an air stream. A housing encloses a fan for drawing debris-laden air into a forward portion of the housing and rotating the air so as to form a rotating flow pattern that stratifies the debris-laden air, with the heavier particles of debris in the outermost orbits of the rotating flow pattern. The thus rotating air passes through an annulus to a rear portion of the housing in which the air flow is caused to back up. As a consequence, some solid debris in the forward housing portion moves into a forward isolation region from which that debris is ejected through a forward exit orifice. Other solid debris in the rear housing portion enters a rear isolation region from which it is ejected through a rear exit orifice. The thus-cleaned air passes through an exit gap to an air outlet from which it exits the air cleaner for use. The relationship between the sizes of the front and rear housing portions, the annulus, the front and rear exit orifices, the gap, and the fan capacity controls the size and amount of solid debris ejected through the exit orifices.

14 Claims, 5 Drawing Sheets

AIR CLEANER

CROSS-REFERENCE TO RELATED APPLICATIONS

This application is a continuation of U.S. application Ser. No. 09/523,516 filed Mar. 10, 2000, now U.S. Pat. No. 6,338,745, which claims the benefit of U.S. Provisional Application No. 60/124,010, filed Mar. 12, 1999, and is related to U.S. applications Ser. No. 09/369,846, filed Aug. 9, 1999 now U.S. Pat. No. 6,319,304, and Ser. No. 09/984,822, filed Oct. 31, 2001, the disclosures of which are incorporated herein by reference.

BACKGROUND OF THE INVENTION

The present invention pertains to an air cleaner for centrifugally ejecting heavier-than-air particulate debris from an air stream. More particularly, the present invention pertains to an air cleaner for separating heavier-than-air particulate debris out of an air stream that is drawn into the device, ejecting the debris back into the environment outside of the device, and discharging the thus-cleaned air for use in an apparatus such as an internal combustion engine, a ventilation system, a heat exchanger, an air compressor, the cab of a piece of earth-moving or other equipment, or any apparatus needing a supply of clean air but operating in an environment where the air may be laden with debris.

Air cleaners are already available for separating heavier-than-air particles from air that is to be used in such applications as internal combustion engines, ventilation systems, heat exchangers, air compressors, the cabs of earth-moving equipment, or any apparatus that draws in air laden with heavier-than-air debris. Known air cleaners, while functional, do not address all the needs of the various applications. Such needs include adding no, or minimal, air intake restriction, while providing high particle separating efficiency over the broad airflow range with which they are used.

SUMMARY OF THE INVENTION

The present invention is an improved air cleaner apparatus for centrifugally ejecting heavier-than-air particulate debris from an air stream and delivering clean air with no, or minimal, airflow restriction, to an area or an apparatus on which the air cleaner is installed, while overcoming disadvantages of known air cleaners. The improved air cleaner device of the present invention meets or exceeds the requirements for use in connection with an inline airflow provider for any apparatus requiring or benefiting from clean air flow, for example internal combustion engines, heat exchangers, air compressors, heating and air conditioning systems, and total airflow applications for ventilation systems.

The air cleaner apparatus of the present invention offers significant improvements in debris removal and provides positive airflow, as compared with conventional atmospheric ejective air cleaners. Instead of depending on the available airflow to drive the mechanical separation process, which adds to the restriction of the system, the present invention delivers efficient air cleaning while adding no additional restriction to the apparatus on which the air cleaner is installed. In fact, the air cleaner apparatus of the present invention may add to an air intake system, minimizing or eliminating overall initial restriction.

In accordance with the present invention, a fan assembly draws debris-laden air into a housing in which the debris-laden air is rotated so that centrifugal forces act on the debris. These centrifugal forces then discharge the heavier-than-air debris out of one of two strategically placed outlet orifices, back into the atmosphere. The air cleaner apparatus maintains a positive air pressure on the downstream side, such as a filter media, an internal combustion engine, a heat exchanger core, or a ventilation system. Therefore, the air cleaning apparatus of the invention does not suffer performance losses associated with cyclic airflow demands, like other air cleaners do.

An air cleaner device according to the present invention includes a housing enclosing a fan for drawing debris-laden air into the housing and moving the debris-laden air in a rotating flow pattern that stratifies the debris-laden air, with the heavier particles of debris in the outermost orbits of the rotating flow pattern. The thus-cleaned air encounters an exit gap which causes the air flow to back up, and so causing debris forward of the fan to enter a first, front isolation region from which it is ejected through a front exit orifice and debris to the rear of the fan to enter a second, rear isolation region from which it is ejected through a rear exit orifice. An air outlet of the device permits the cleaned air to flow from the apparatus to an application for the cleaned air.

BRIEF DESCRIPTION OF THE DRAWINGS

These and other aspects and advantages of the present invention are more apparent from the following detailed description and claims, particularly when considered in conjunction with the accompanying drawings. In the drawings:

Figure 1:
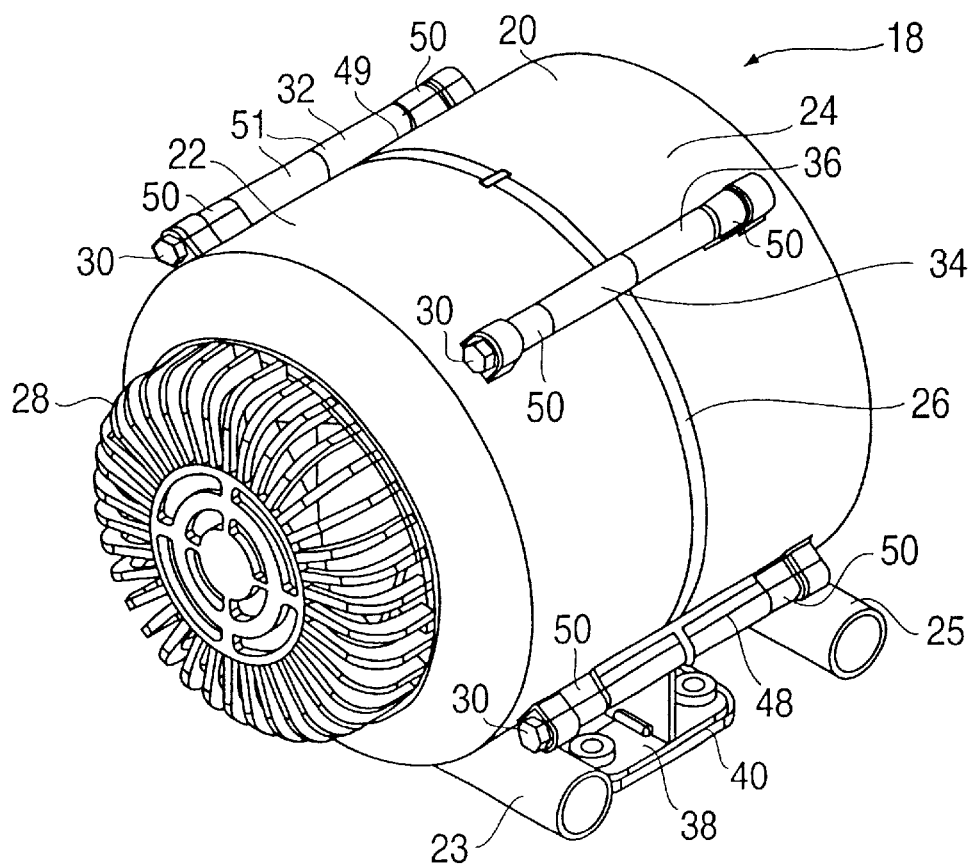
FIG. 1 is a perspective view of an air cleaner in accordance with a preferred embodiment of the present invention.
Figure 3A:
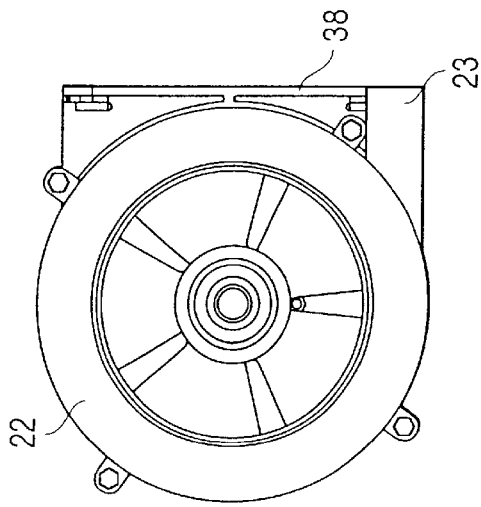
Figure 3B:
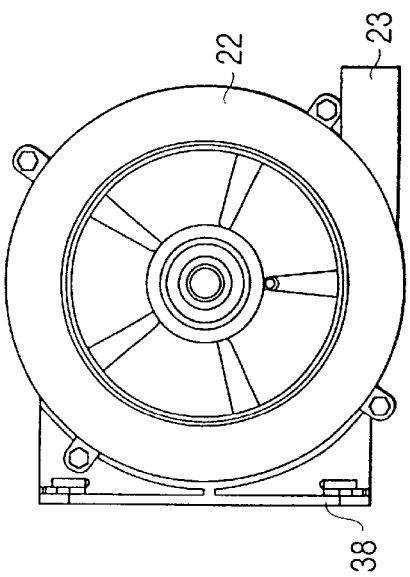
Figure 3C:
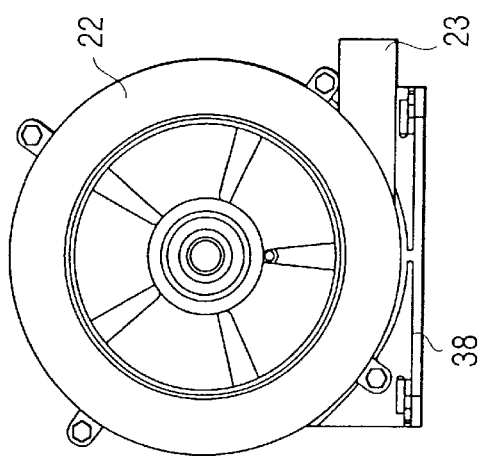
Figure 3D:
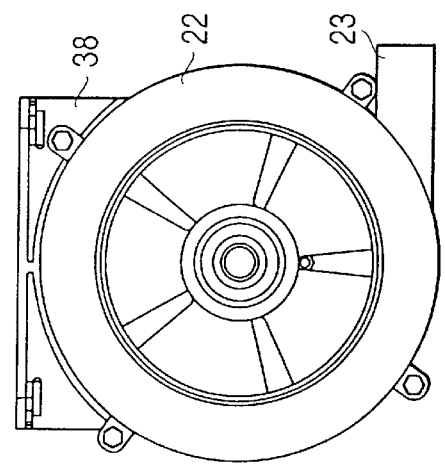
Figure 4:
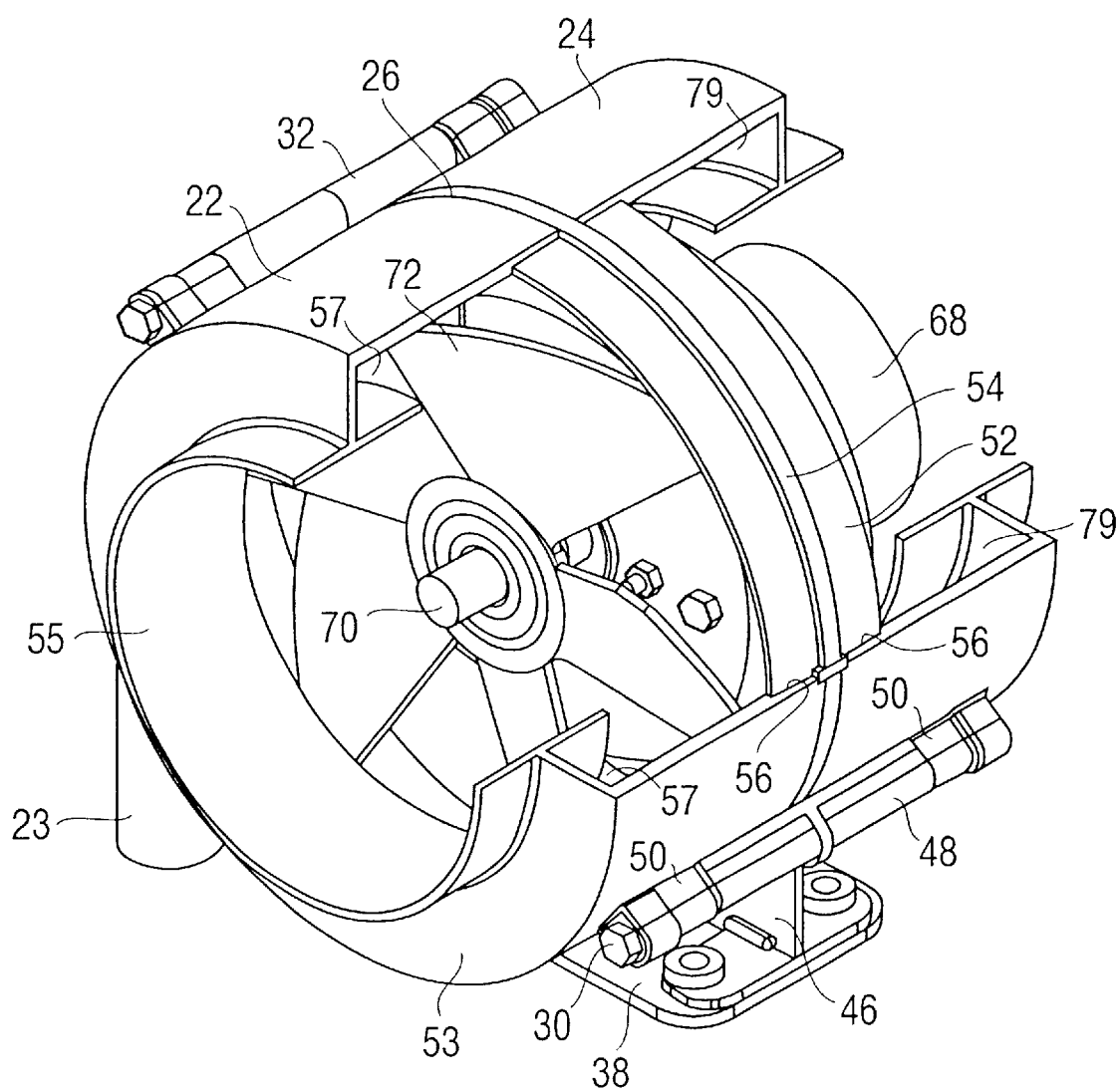
Figure 5:
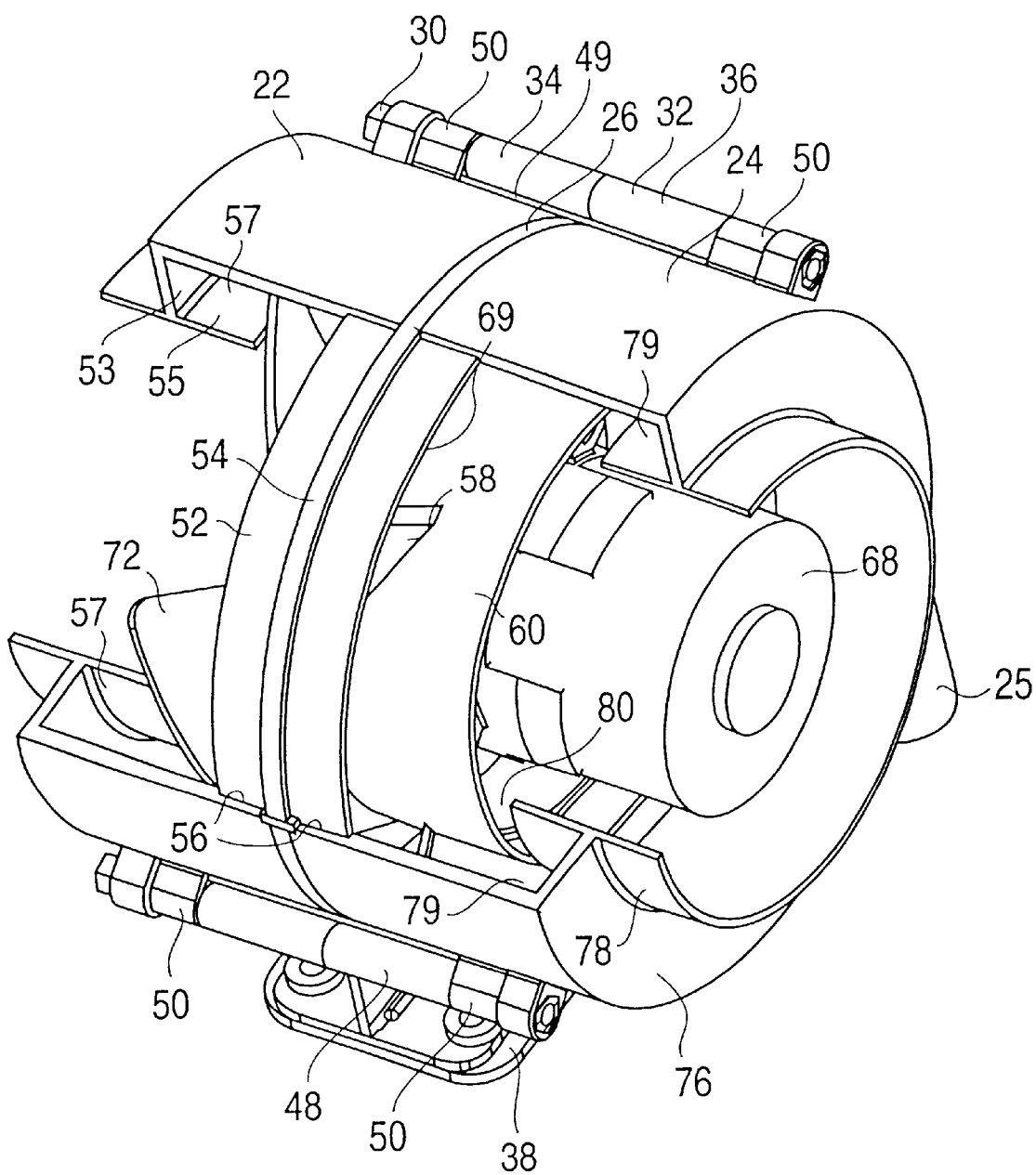
Figure 6:
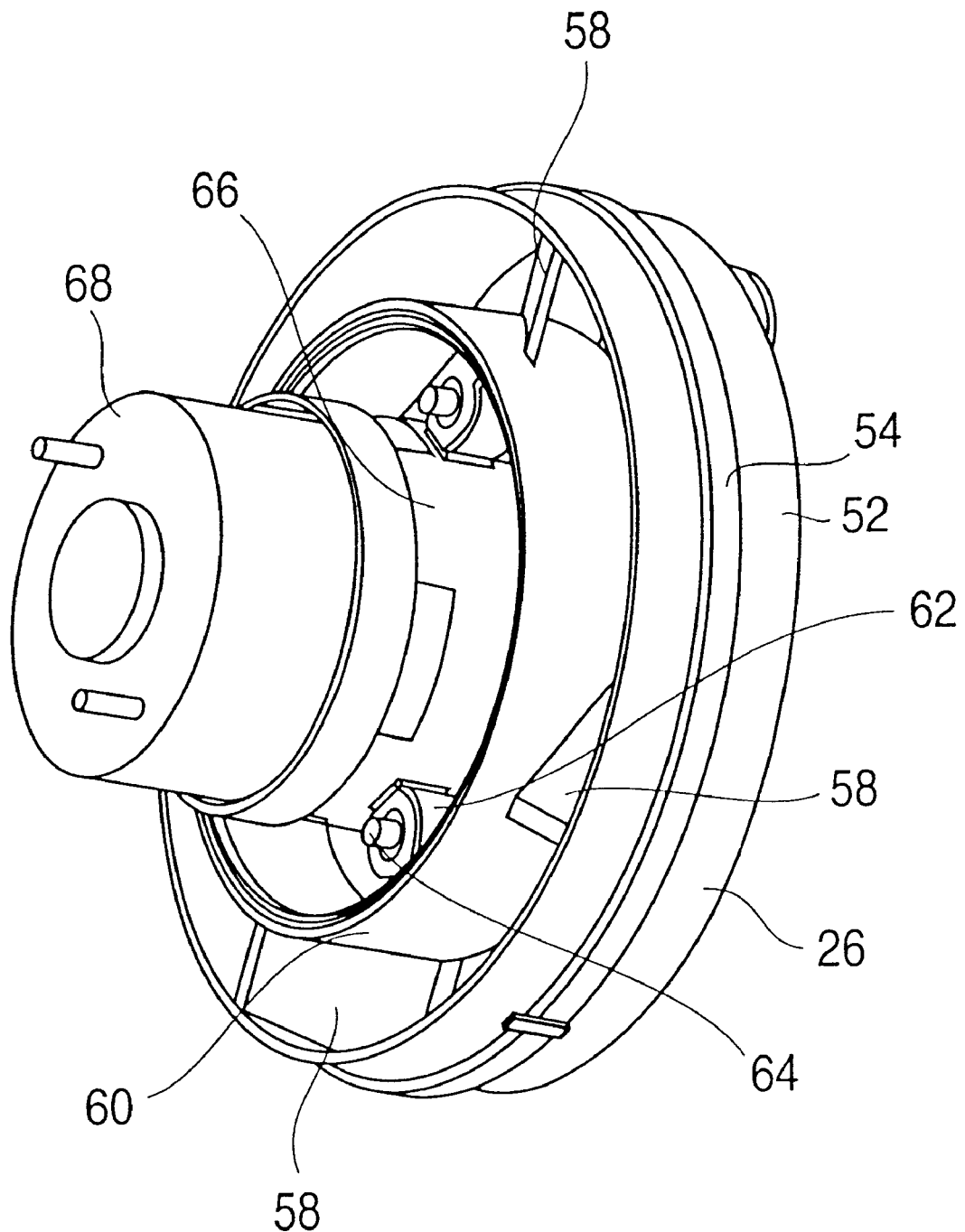

Each of FIGS. 3A, 3B, 3C, and 3D is a front elevation view of an air cleaner in accordance with the present invention, with the intake grill removed, and showing positioning of the mounting bracket in different orientations on the air cleaner;

FIG. 4 is a front perspective view, partially broken, of the air cleaner of FIG. 1;

FIG. 5 is a rear perspective view, partially broken, of the air cleaner of FIG. 1; and FIG. 6 is a perspective view of one of the internal components of the air cleaner of FIG. 1.

DETAILED DESCRIPTION OF A PREFERRED EMBODIMENT

FIG. 1 depicts an air cleaner 18 in accordance with a preferred embodiment of the present invention. Air cleaner 18 includes a substantially cylindrical housing 20 containing a flow path for air to be cleaned which extends through the air cleaner from an air inlet defined by inlet wall portion 55 (FIG. 4) to an air outlet defined by outlet wall portion 78 (FIG. 5). The housing 20 is made up of a forward housing portion 22 and a rear housing portion 24. A central connecting portion 26 is positioned between forward housing portion 22 and rear housing portion 24. Preferably, an intake grill 28 is positioned on the forward, inlet end of forward housing portion 22, and thus the forward or inlet end of cylindrical housing 20. A forward exit orifice 23 passes through the cylindrical wall of forward housing portion 22, adjacent the inlet end of cylindrical housing 20, while a rear exit orifice 25 passes through the cylindrical wall of rear housing portion 24, adjacent the rear, outlet end of cylindrical housing 20.

Forward housing portion 22, central connecting portion 26, and rear housing portion 24 are held together by a plurality of nut and bolt assemblies 30, each of which passes through a tubular member 32. Each tubular member 32 includes a forward portion 34 and a rear portion 36. The forward portion 34 and rear portion 36 of each tubular member 32 are connected to the respective forward housing portion 22 and rear housing portion 24 by joining portions 50, leaving a small gap 49 between the remaining segments 51 of each portion 34, 36 of tubular member 32 and the adjacent housing portion 22, 24.

Figure 2:
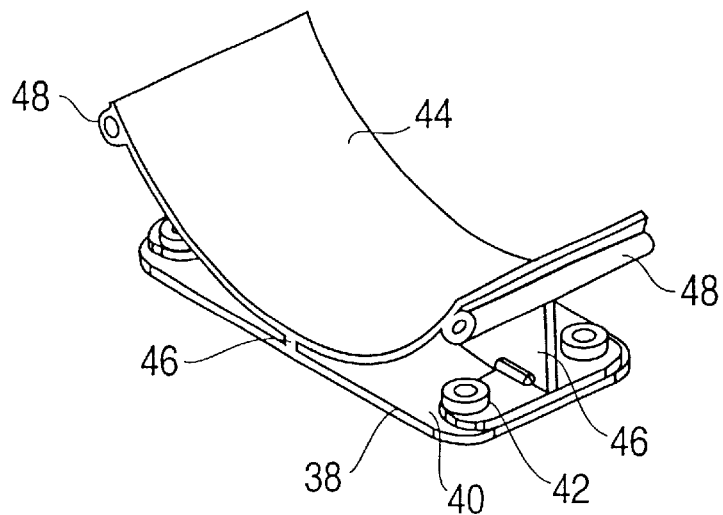
FIG. 2 is a perspective view of a mounting bracket suitable for mounting the air cleaner of the present invention on a mounting surface.

A mounting bracket 38 is provided for mounting the air cleaner in a desired location. As shown in FIG. 2, the mounting bracket 38 includes a base 40 which is provided with a plurality of reinforced mounting openings 42 for passage of mounting bolts to mount the air cleaner on an appropriate mounting surface. Further, mounting bracket 38 includes a cradle 44 fixed to base 40 by a plurality of web members 46. On each side of cradle 44 a mounting cylinder 48 is provided. The two segments 51 of each of two tubular members 32 fit within the central openings of the two mounting cylinders 48 of mounting bracket 38, as shown in FIG. 1. As a consequence, as illustrated in FIGS. 3A, 3B, 3C, and 3D the mounting bracket 38 can be attached to the cylindrical housing 20 in any of four orientations relative to the exit orifices 23 and 25. This assures that the air cleaner can be mounted in an orientation permitting the airborne debris to be blown in a desired direction relative to the mounting surface. Various orientations of the mounting bracket 38 on housing 20 are depicted in different ones of the drawing figures.

Referring to FIG. 4, the inlet end of housing 20 has a radially inwardly extending wall 53 which supports a cylindrical inlet wall portion 55 of a diameter less than the diameter of forward housing portion 22 and rear housing portion 24. Intake grill 28 fits on inlet wall portion 55. Inlet wall portion 55 extends axially into the interior of forward housing portion 22 to form a U-shaped channel 57 that extends around the forward periphery of forward housing portion 22, forming a first, forward isolation region. Forward exit orifice 23 opens from the isolation region of channel 57.

As seen in FIGS. 4, 5, and 6, central connecting portion 26 includes a cylindrical wall 52 and a radially outwardly extending web 54. The cylindrical wall 52 fits within notches 56 in the inner ends of the internal walls of cylindrical housing portions 22 and 24, and web 54 fits between the inner ends of housing portions 22 and 24 so that central connecting portion 26 cooperates with tubular members 32 and nut and bolt assemblies 30 to maintain cylindrical housing 20 as a unitary structure.

As depicted in FIGS. 5 and 6, a plurality of support members 58 extend inwardly from the inner circumferential surface of central connecting portion 26 to position a substantially cylindrical support sleeve 60 centrally within connecting portion 26. An annulus 69 is defined between the exterior surface of cylindrical support sleeve 60 and the interior surface of central connecting portion 26. The longitudinal axis of support sleeve 60 is substantially aligned with the longitudinal axis of cylindrical housing 20. FIGS. 5 and 6 illustrate support members 58 in the form of a plurality of louvers 58 which are angled with respect to the longitudinal axis of central connecting portion 26. While other shapes might be utilized, the angled louvers tend to provide secure support for support sleeve 60 and may increase the rotational movement of the air flowing through annulus 69.

As best seen in FIG. 6, a number of mounting members 62 extend from the inner circumferential surface of cylindrical support sleeve 60 and receive bolts 64 which cooperate with nuts (not shown) to support motor mount 66 centrally within cylindrical housing 20. Referring to FIGS. 4-6, motor mount 66 mounts a motor 68, on the shaft 70 of which a fan 72 is supported within forward housing portion 22. Motor mount 64 and motor 68 substantially close the interior of cylindrical support sleeve 60 so as to substantially prevent airflow therethrough, leaving annulus 69 which has a cross-sectional area less than the cross-sectional area of front housing portion 22. As a consequence, the velocity of the air urged into housing 20 by fan 72 increases as the air passes through annulus 69. Angled louvers 58 may aid in rotating the air as the air passes through annulus 69, increasing the centrifugal force which urges foreign objects in the air radially outwardly, toward the inner cylindrical surface of housing 20.

Referring to FIG. 5, the outlet end of cylindrical housing 20 has a radially inwardly extending wall 76 which supports a substantially cylindrical outlet wall portion 78 of a diameter substantially equal to the diameter of cylindrical support sleeve 60. Outlet wall portion 78 extends axially into the interior of rear housing portion 24 to form a U-shaped channel 79 that extends around the rear periphery of rear housing portion 24, forming a second, rear isolation region. Rear exit orifice 25 opens from the rear isolation region of channel 79. The inner end of outlet wall portion 78 is spaced from the rear end of support sleeve 60 to define an air outlet gap 80 adjacent the rear of rear housing portion 24. Air from which solid debris has been removed passes through air outlet gap 80 and exits air cleaner 18 through the outlet end thereof. Preferably, gap 80 is positioned such that the air passing through it cools motor 68.

In operation, motor 68 is powered to rotate fan 72, drawing air through grill 28 and the inlet end of forward housing portion 22 and causing that air, and the solid debris within it to rotate as it moves through housing 20. Fan 72 forces that air through annulus 69 in central connecting portion, causing the velocity of the air to increase. Foreign objects in that air move radially outwardly within the rotating air. The debris-laden air stream is restrained within rear housing portion, causing the rotating air to back up. As a consequence much solid debris within forward housing portion 22 enters forward U-shaped channel 57 in which it is restrained from returning to the central area of forward housing portion. Consequently, this debris rotates within channel 57 until it exits cylindrical housing 20 through forward exit orifice 23. Additional solid debris that has passed through central connecting portion 26 is urged radially outwardly by the rotating air in rear housing portion 24 and is urged rearwardly by the higher air velocity resulting from passage of the air through annulus 69. This debris enters rear U-shaped channel 79 in which it is restrained from returning to the central area of rear housing portion and kept from gap 80. Consequently, this debris rotates within channel 79 until it exits from housing 20 through rear exit orifice 25. The resulting air from which that solid debris has been removed passes radially inwardly through gap 80 and out the air outlet defined by cylindrical outlet wall 78. Thus the air cleaner of the present invention provides air from which solid debris, such as biological debris, rocks, grass, snow, rain water and dust has been removed.

The relationship between the cross-sectional area of front housing portion 22, the cross-sectional area of annulus 69, the capacity of fan 72, the cross-sectional area of rear housing portion 24, and the cross-sectional areas of front exit orifice 23 and rear exit orifice 25, and the gap 80 affects the size and quantity of the solid debris that is ejected through exit orifices 23 and 25. Any of these might be varied to control the operation of the air cleaner of the present invention so as to select the type of solid debris it removes from the air. By way of example, an air cleaner providing air to the cab of a large piece of earth moving equipment might have different requirements than an air cleaner providing air to a heat exchanger, not only requirements as to air quality, but also requirements as to air quantity. By controlling the above-mentioned parameters, an air cleaner can be provided meeting various needs, all in accordance with the present invention.

Although the present invention has been described with reference to a preferred embodiment, various rearrangements, alterations, and substitutions could be made, and still the result would be within the scope of the invention.

What is claimed is:

1. A powered air cleaning system for separating heavier-than-air particulate debris from debris laden air to provide a clean air flow, said system comprising:
    a flow path extending through the system from an inlet to an outlet;
    a fan located along the flow path to draw debris laden air into the inlet and rotate it about an axis to form a rotating flow pattern that stratifies the debris laden air with the heavier particles of debris in the outermost orbits of the rotating flow pattern;
        a first isolation region in the flow path where particles of debris are removed from the flow to clean the air;
        a reduced cross sectional area portion in the flow path downstream of the first isolation region to increase the velocity of clean air flow to induce momentum forces to any remaining debris in the clean air flow; and
        a second isolation region in the flow path downstream of the reduced cross sectional area portion where remaining debris is removed from the flow to further clean the air;
        wherein the fan is located along the flow path between the first and second isolation regions.

2. A powered air cleaning system according to claim 1, wherein the fan includes an assembly of a fan blade and a motor drivingly connected to the fan blade.

3. A powered air cleaning system according to claim 1, further comprising angled louvers in the flow path, and wherein the fan is mounted in the system by way of the angled louvers.

4. A powered air cleaning system according to claim 1, wherein the reduced cross sectional area portion includes an annulus having angled louvers therein to aid in rotating the air.

5. A powered air cleaning system according to claim 1, wherein each of the first and second isolation regions has a debris exit orifice exiting of debris from the isolation regions.

6. A method of separating heavier-than-air particulate debris from debris laden air to provide a clean air flow, said method comprising:
    drawing debris laden air into an air cleaning system through an air inlet of the system with a fan located in the system between first and second isolation regions in the system spaced from one another along a flow path extending through the system from the air inlet to an air outlet;
    rotating the debris laden air in the air cleaning system to form a rotating flow pattern about a longitudinal axis of the system to stratify the debris laden air, with heavier particles of the debris in the outermost orbits of the rotating flow pattern of debris laden air;
    removing particles of debris from the flow at the first isolation region of the system upstream of the fan to clean the air;
    increasing the velocity of the clean air flow to induce momentum forces to any remaining debris therein;
    removing further debris from the flow at the second isolation region of the system downstream of the fan to further clean the air; and
    flowing the further cleaned air to the air outlet of the system.

7. The method according to claim 6, wherein the removing remaining debris from the flow to further clean the air includes restraining the rotating flow and changing the air flow direction to separate debris from the flow.

8. The method according to claim 7, wherein the change in air flow direction requires the flow to move radially inward as it flows toward the air outlet.

9. The method according to claim 6, further comprising ejecting debris removed from the flow from the air cleaning system.

10. The method according to claim 6, further comprising flowing the further cleaned air through an air filter.

11. The method according to claim 6, further comprising maintaining a positive air pressure in the air cleaning system at the air outlet.

12. The method according to claim 6, including flowing clean air from the system to an air intake of a combustion engine.

13. The method according to claim 6, wherein increasing the velocity of the clean air flow includes flowing the clean air flow through a reduced cross sectional area annulus along the flow path.

14. The method according to claim 6, wherein increasing the velocity of the clean air flow includes flowing the clean air flow through a reduced cross sectional area annulus along the flow path having angled louvers therein to aid in rotating the air.

* * * * *